(12) United States Patent
Asbra et al.

(10) Patent No.: US 10,238,898 B2
(45) Date of Patent: Mar. 26, 2019

(54) AIR CONDITIONED AND AMBIENT FRESH AIR SUPPLY SYSTEM FOR RESPIRATOR USERS

(71) Applicants: Michael Dean Asbra, Harrison, TN (US); Serena Therese Asbra, Harrison, TN (US)

(72) Inventors: Michael Dean Asbra, Harrison, TN (US); Serena Therese Asbra, Harrison, TN (US)

(*) Notice: Subject to any disclaimer, the term of this patent is extended or adjusted under 35 U.S.C. 154(b) by 205 days.

(21) Appl. No.: 15/270,639

(22) Filed: Sep. 20, 2016

(65) Prior Publication Data

US 2017/0007860 A1 Jan. 12, 2017

Related U.S. Application Data

(63) Continuation-in-part of application No. 14/255,781, filed on Apr. 17, 2014, now abandoned, which is a continuation-in-part of application No. 13/303,462, filed on Nov. 23, 2011, now abandoned.

(60) Provisional application No. 61/416,601, filed on Nov. 23, 2010.

(51) Int. Cl.
| | | |
|---|---|---|
| *A62B 7/10* | (2006.01) | |
| *A62B 7/12* | (2006.01) | |
| *A62B 9/00* | (2006.01) | |
| *F24F 1/02* | (2019.01) | |
| *A62B 17/00* | (2006.01) | |
| *A62B 17/04* | (2006.01) | |
| *A62B 18/02* | (2006.01) | |
| *F24F 11/77* | (2018.01) | |

(52) U.S. Cl.
CPC ............ *A62B 9/003* (2013.01); *A62B 7/10* (2013.01); *A62B 7/12* (2013.01); *A62B 17/006* (2013.01); *A62B 17/04* (2013.01); *A62B 18/02* (2013.01); *F24F 1/025* (2013.01); *F24F 11/77* (2018.01); *Y02B 30/746* (2013.01)

(58) Field of Classification Search
CPC ......... F24F 1/025; F24F 1/0011; F25D 21/14; F25D 23/006; F25D 23/12
See application file for complete search history.

(56) References Cited

U.S. PATENT DOCUMENTS

| | | | | |
|---|---|---|---|---|
| 2,163,691 A | * | 6/1939 | Lichty | F24F 1/025 261/104 |
| 2,175,946 A | * | 10/1939 | Smith | F24F 1/022 62/150 |
| 2,176,319 A | * | 10/1939 | Anderson | F24F 1/0007 165/135 |

(Continued)

*Primary Examiner* — Kun Kai Ma
(74) *Attorney, Agent, or Firm* — Chambliss, Bahner & Stophel, P.C.

(57) ABSTRACT

A portable air conditioning and ambient fresh air supply system that provides ambient fresh or conditioned air to a user wearing a respirator. The apparatus comprises a cabinet having an upper chamber and a lower chamber. The lower chamber holds a refrigerant air conditioning system and the upper chamber holds a blower that supplies cooled air to the surroundings. The user is able to control the temperature of the conditioned air by means of a control panel and the air flow rate by a blower control switch. An air outlet manifold supplies fresh or conditioned air through an air supply line to a respirator mask.

19 Claims, 12 Drawing Sheets

(56) References Cited

U.S. PATENT DOCUMENTS

| | | | | | |
|---|---|---|---|---|---|
| 2,529,203 | A | * | 11/1950 | Turpin | F24F 1/022 62/295 |
| 2,549,042 | A | * | 4/1951 | Angermueller | B08B 15/023 454/57 |
| 2,706,241 | A | * | 4/1955 | Granger, Jr. | F24H 3/0417 219/202 |
| 2,776,553 | A | * | 1/1957 | Williamson | F24F 1/02 261/119.1 |
| 2,811,842 | A | * | 11/1957 | Taylor | F24F 1/025 62/150 |
| 2,987,259 | A | * | 6/1961 | Lindquist | B08B 3/026 122/250 R |
| 3,973,101 | A | * | 8/1976 | Bosse | F24H 3/0411 392/369 |
| 4,560,395 | A | * | 12/1985 | Davis | F24F 3/1603 96/381 |
| 4,987,952 | A | * | 1/1991 | Beal | F24F 1/022 165/225 |
| 5,584,286 | A | * | 12/1996 | Kippax | A62B 7/00 128/200.24 |
| 5,826,435 | A | * | 10/1998 | Hange | B60H 1/00264 62/190 |
| 6,295,823 | B1 | * | 10/2001 | Odom | F24F 1/0007 165/139 |
| 6,884,159 | B1 | * | 4/2005 | Ferraud, Jr. | B60H 1/00592 454/119 |
| 7,190,887 | B1 | * | 3/2007 | Compton | F24H 3/0417 219/533 |
| 2005/0235678 | A1 | * | 10/2005 | Lee | F24F 1/022 62/412 |
| 2006/0086124 | A1 | * | 4/2006 | Sellers | F24F 1/0003 62/298 |
| 2006/0272980 | A1 | * | 12/2006 | Montgomery | A45C 7/0045 206/576 |
| 2008/0104990 | A1 | * | 5/2008 | Lee | F24F 1/025 62/291 |
| 2009/0114732 | A1 | * | 5/2009 | Hawkins | F24D 5/12 237/12 |
| 2010/0062522 | A1 | * | 3/2010 | Fanning | C12M 41/14 435/303.1 |
| 2010/0118488 | A1 | * | 5/2010 | Hoffman | H05K 7/20909 361/691 |
| 2010/0198411 | A1 | * | 8/2010 | Wolfson | G05B 15/02 700/275 |
| 2012/0042685 | A1 | * | 2/2012 | Dahl | B64F 1/362 62/498 |

* cited by examiner

Fig. 3
Hose Insulation
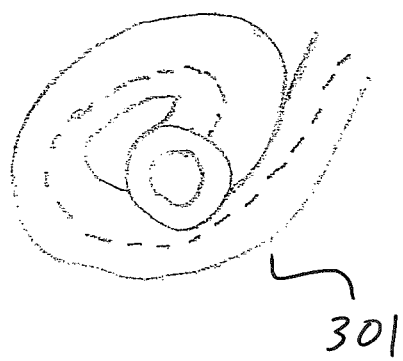
301
Scuff Jacket for Hoses
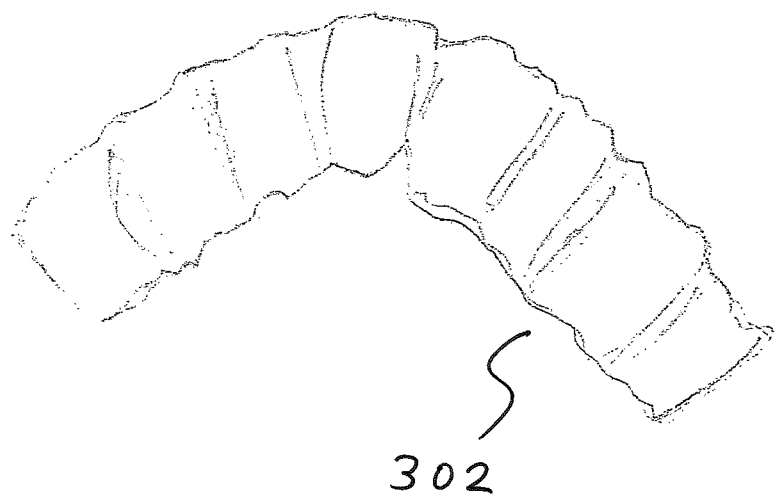
302

Fig. 4
HOOD
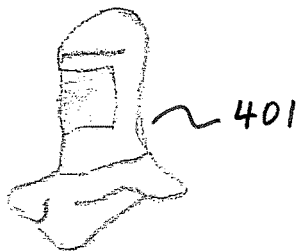
FULL FACED MASK
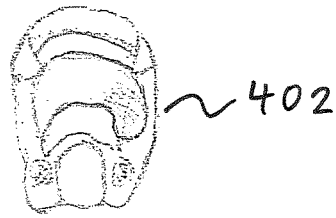
WELDER MASK
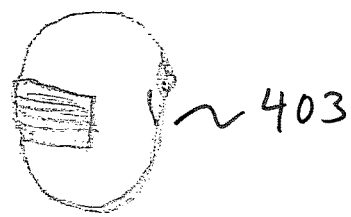
AIR FLOW SHIELD
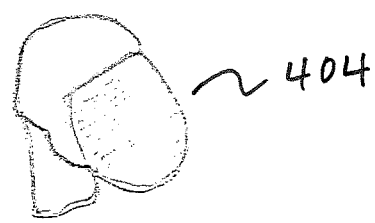

Fig. 5
Air-Line hose
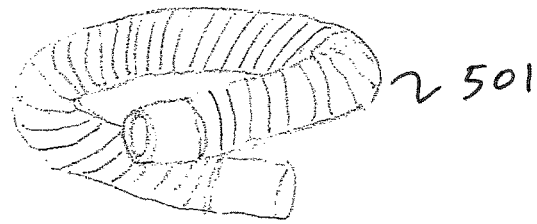
Niosh Air-line Hose
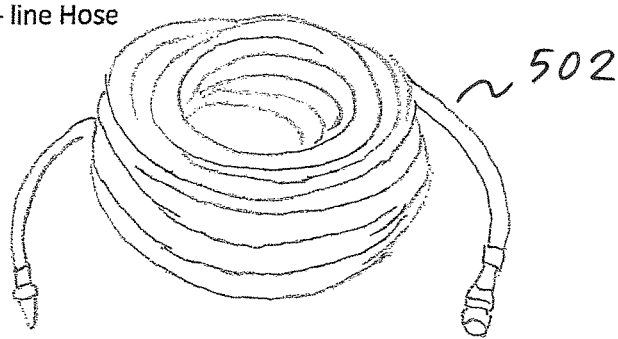
Breathing tube assembly
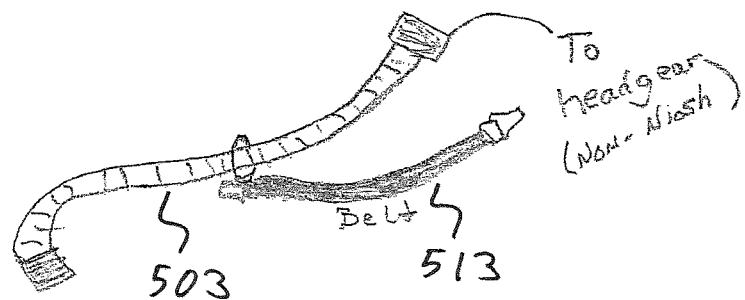
Niosh Breathing tube assembly
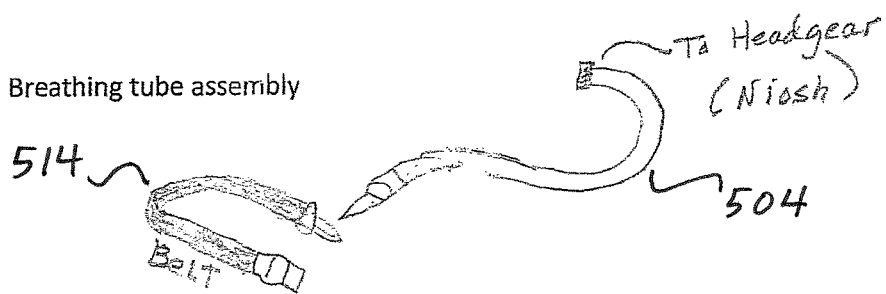

AIR CONDITIONED AND AMBIENT FRESH AIR SUPPLY SYSTEM FOR RESPIRATOR USERS

CROSS-REFERENCE TO RELATED APPLICATIONS

The present application is a continuation-in-part of U.S. patent application Ser. No. 14/255,781, filed Apr. 17, 2014, which is a continuation-in-part of U.S. patent application Ser. No. 13/303,462, filed Nov. 23, 2011, which claims priority to U.S. Provisional Patent Application Ser. No. 61/416,601, filed Nov. 23, 2010. The entire content of the all of the foregoing applications is incorporated herein by reference.

FIELD OF THE INVENTION

The present invention relates generally to an apparatus and system for providing conditioned air. More particularly, the present invention produces and supplies ambient air conditioned fresh air or ambient fresh air for users requiring clean air for respirator usage.

BACKGROUND OF THE INVENTION

In many areas of worldwide occupations, several general skilled trades, construction workers, refinishers, painters, sandblasters (non silica), spray foam insulation applicators, etc., require breathable air in construction zones or areas that contain less than desirable breathable quality air. Depending on the climate and season of the construction zones/areas, keeping the maintenance of proper breathing air quality is important to prevent the fatigue of workers, eliminate exhaustion, cramps, nausea, dizziness and weakness. The apparatus and included components increase production, profit margins and assure workers are kept safe and maintain a better attitude towards using respirator fresh air supply systems.

Furthermore, by providing an air conditioned or fresh air supply system that includes respirator protection, skilled trade workers are able to work in an environment with clean, safe, hypoallergenic air. However, many construction zones and areas do not have air conditioning fresh air supply units with respirator protection and workers are forced to work under undesirable conditions. It is therefore an object of the present invention to introduce an apparatus for producing and supplying fresh air conditioned or ambient fresh air for users requiring breathable clean air through a respirator mask. The apparatus and included components provide year round protection and comfort, regardless of climatic regions, ambient temperatures, or the conditions of the work environment.

BRIEF SUMMARY

In various example embodiments of the present general inventive concept, air conditioned and ambient fresh air supply system for a respirator user encompasses a cabinet including an upper chamber, a lower chamber, and an insulated partition separating the upper chamber from the lower chamber, said insulated partition having a blower inlet opening between the upper chamber and the lower chamber, said insulated partition having an air relief hole therethrough; a refrigerant air conditioning unit that is entirely contained within the lower chamber, said refrigerant air conditioning unit including an ambient air inlet for drawing air from the surrounding environment, being adapted to cool ambient air drawn through the ambient air inlet, and including a first conditioned air outlet for discharging cooled air; and a blower in the upper chamber, said blower comprising a blower inlet that is in fluid communication with the first conditioned air outlet of the refrigerant air conditioning unit through the blower inlet opening, a blower outlet comprising a cool air supply tube, a blower fan that is adapted to draw cooled air from the first conditioned air outlet of the air conditioning unit through the blower inlet and discharge the cooled air from the first conditioned air outlet of the air conditioning unit though the cool air supply tube, and a blower control switch that may be operated by a user to regulate the rate at which cooled air is discharged through the cool air supply tube within a range of 0-97 cubic feet per minute.

In various example embodiments of the present general inventive concept, a method for supplying conditioned air to a respirator user comprises providing a device including an upper chamber, a lower chamber, an insulated partition separating the upper chamber from the lower chamber, a refrigerant air conditioning unit that is entirely contained within the lower chamber, said refrigerant air conditioning unit including an ambient air inlet for drawing air from the surrounding environment and a first conditioned air outlet for discharging cooled air, said refrigerant air conditioning unit being adapted to cool ambient air drawn through the ambient air inlet, a blower in the upper chamber, said blower comprising a blower inlet that is in fluid communication with the first conditioned air outlet of the refrigerant air conditioning unit through the blower inlet opening, a blower outlet comprising a cool air supply tube, and a blower fan that is adapted to draw cooled air from the first conditioned air outlet of the air conditioning unit through the blower inlet and discharge the cooled air from the first conditioned air outlet of the air conditioning unit though the cool air supply tube, and a blower control that may be operated by a user to regulate the rate at which cooled air is discharged through the cool air supply tube within a range of 0-97 cubic feet per minute; providing an air supply line to which a respirator is attached; attaching the air supply line to the cool air supply tube; selecting a rate at which cooled air is supplied to a user within the range of 0-97 cubic feet per minute; operating the device to provide cooled air at the selected rate to a user.

BRIEF DESCRIPTION OF THE DRAWINGS

FIG. 3 is a perspective view of hose insulation and scuff jacket for hoses for use in connection with example embodiments of the present general inventive concept;

FIG. 4 is a view of several example embodiments of masks for use in connection with the present general inventive concept;

FIG. 5 is a view of several example embodiments of hoses and breathing tube assemblies for use in connection with the present general inventive concept;

DETAILED DESCRIPTIONS OF THE INVENTION

All illustrations of the drawings are for the purpose of describing selected versions of the present invention and are not intended to limit the scope of the present invention.

The present invention, in some of its various example embodiments, encompasses a portable air conditioning system that produces and supplies ambient air conditioned or fresh air to trades people that require breathable clean air in working environments where the ambient air is unsuitable for breathing. A preferred embodiment of the present invention utilizes a refrigerant system that contains R-410A, rated as an A1 ASHRAE safety classification, to produce air conditioned or fresh air. The present invention is able take the surrounding ambient air to be conditioned to a specific temperature designated by the operator. The present invention provides strictly positive air flow and does not rely on a supply and return configuration. Generally, the present invention is not optimized for providing conditioned air for enclosed spaces, rooms or buildings; rather, the present invention provides breathable air to a user in an enclosed space by conditioning ambient air outside the enclosed space and delivering the air to the user through a tube traversing from the main unit positioned outside the enclosed space to the user inside the enclosed space.

The present invention is disclosed in a preferred embodiment as being known in the industry as a type "A" supplied-air respirator, or a hose mask respirator for entry into and escape from atmospheres not immediately dangerous to life or health, which consists of a motor-driven or hand-operated blower that permits the free entrance of air when the blower is not operating, a strong large-diameter hose having a low resistance to airflow, a harness to which the breathing hose is attached and a tight-fitting face piece. The present invention is either portable or can be placed in a permanent position in a work area. The fresh air supply system must be placed so that the air intake is in an environment with clean, breathable quality air. The present invention allows a user to enter work areas with extended air lines and respirator protection to ensure the delivery of clean, breathable conditioned air or fresh air to the respirator user.

Figure 1:
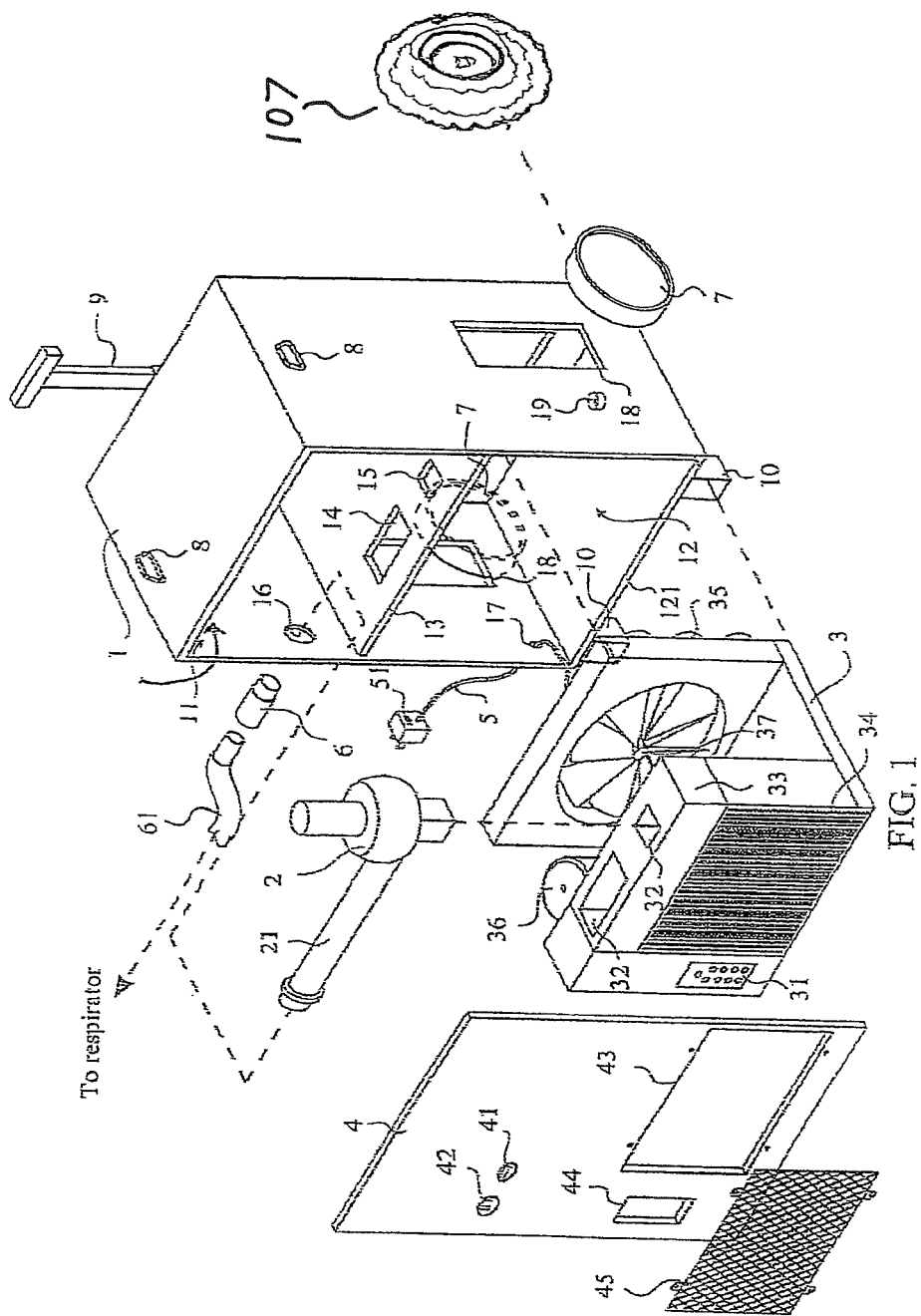
FIG. 1 is a perspective exploded view of an example embodiment of the present invention with a single line manifold.

Turning to the Figures, FIG. 1 shows generally one example embodiment of the present general inventive concept, in which air conditioned and ambient fresh air supply system for a respirator user comprises a cabinet 1, a blower 2, a refrigerant air conditioning unit 3, a cabinet cover plate 4, an electrical cord 5, an air outlet manifold 6, and an air supply line 61. The blower 2 and the refrigerant air conditioning unit 3 are positioned within the cabinet and function to supply fresh ambient or conditioned air through the air outlet manifold 6 and thus the air supply line 61 as well. When in use, the air supply line 61 is connected to a respirator in order to allow a user to be supplied with fresh ambient or conditioned air. The respirator should be considered to be an apparatus well known in the art and industry and may comprise any number of applicable types of face or head covering apparatuses suitable for delivering supplied air to a user for breathing, as shown in FIG. 4, such as, but not limited to, a hood assembly 401 with inner support respirator, a full face mask respirator 402, a welder mask 403, an air flow shield respirator 404, or a bump cap.

With continued reference to reference to the example embodiment of the invention shown in FIG. 1, the cabinet 1 comprises an upper chamber 11, a lower chamber 12, a partition 13, an air relief hole 14, a blower inlet opening 15, a power cable hole 17, and a cool air outlet hole 16. The cabinet 1 acts as an enclosure and structural support for the blower 2 and the refrigerant air conditioning unit 3. The refrigerant air conditioning unit 3 is able to intake the ambient air, condition the air, and dispense the newly conditioned air into a user's respirator or environment. The blower 2 is able to regulate the rate at which the ambient air is being conditioned. In a preferred embodiment of the present invention, the blower 2 uses a sealed, self-contained 97 cubic feet per minute (cfm) fan component to ensure proper air delivery to the user.

The upper chamber 11 and the lower chamber 12 are recessed spaces on the cabinet 1 for the containment of the blower 2 and the refrigerant air conditioning unit 3, respectively. The upper chamber 11 and the lower chamber 12 are separated by the partition 13. The refrigerant air conditioning unit 3 is positioned in the lower chamber 12 of the cabinet 1 and the blower 2 is positioned in the upper chamber 11 of the cabinet 1. The air relief hole 14 and the blower inlet opening 15 are holes that are positioned adjacently to each other and are traversed through the partition 13. As a result, the upper chamber 11 and the lower chamber 12 are connected by the air relief hole 14 and the blower inlet opening 15. The cool air outlet hole 16 is a hole that is traversed through the side of the cabinet 1 leading into the upper chamber 11. In a similar fashion, the power cable is a hole traversed through the cabinet 1 leading into the lower chamber 12. The cabinet 1 further comprises a pair of ventilation holes 18. The ventilation holes 18 are holes positioned and traversing through the sides of the cabinet 1 leading into the lower chamber 12. The pair of ventilation holes 18 allows the internal components of the lower chamber 12 to ventilate during operation to prevent overheating. In some embodiments of the present invention, the ventilation holes 18 may have a protective grille. In a preferred embodiment said protective grille should also be capable of filtering solid particulates out of air flow traversing across the ventilation holes 18.

Figure 9:
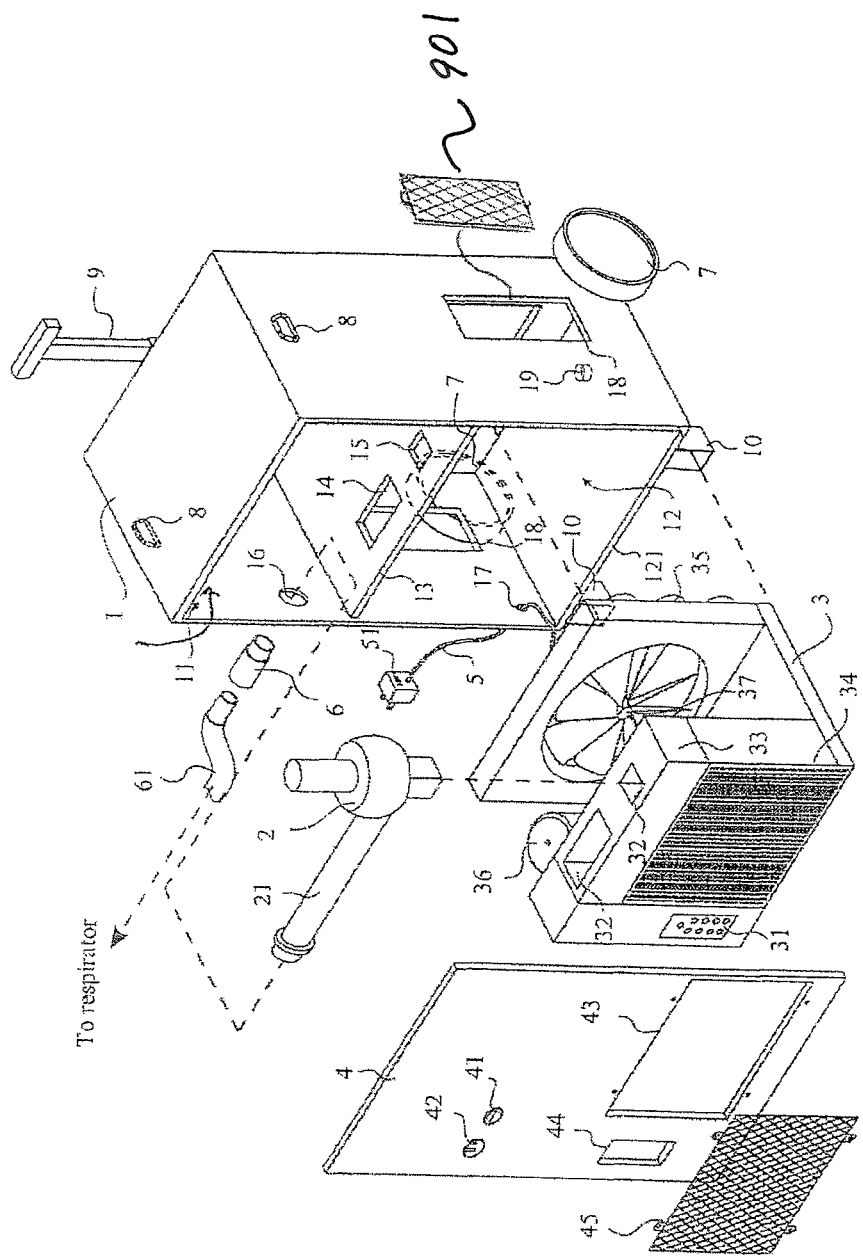
FIG. 9 is a perspective exploded view of an example embodiment of the present invention with a washable foam filters for the side ventilation holes.

Additionally, in some embodiments, the system further includes a washable foam filter or other washable filtration media. The washable foam filter serves as an additional filtering component for the system. Generally, the washable foam filter is positioned over the evaporator hole 43; washable foam filters 901 may also be employed covering the ventilation holes 18, as shown in FIG. 9. In some embodiments, the washable foam filter includes a reticulated polyurethane foam, preferably a flexible, compressed, open-cell polyurethane foam.

Additionally, in a preferred embodiment the cabinet 1 further comprises a drain plug hole 19 traversing vertically through a floor 121 of the lower chamber 12 of the cabinet 1. The drain plug hole 19 is present in order that water condensation produced by the refrigerant air conditioning unit may be drained out of the cabinet 1.

The refrigerant air conditioning unit 3 further comprises a control panel 31, an air outlet cover 33, an evaporator 34, a condenser 35, and a compressor 36. In a preferred embodiment of the present invention, the refrigerant air conditioning unit 3 comprises a 8000 BTU air conditioning unit, though the refrigerant air conditioning unit 3 is not limited to this specification. The evaporator 34 being connected to the condenser 35 is able to circulate the refrigerant to cool the drawn ambient air. The condenser 35 further comprises a fan 37. The control panel 31 is positioned on the refrigerant air conditioning unit 3 adjacent to the evaporator 34. The cool air supply hole 32 is a channel that is positioned over the evaporator 34 and the control panel 31. The cool air supply hole 32 supplies the conditioned air to the blower to be dispensed by the present invention. The cool air supply hole 32 is further enveloped by the condenser outlet cover 33. Connecting the condenser 35 and the evaporator 34 together is the compressor 36. The compressor 36 cycles the refrigerant through the refrigerant air conditioning unit 3 to extract heat from the collected air. With the refrigerant air conditioning unit 3 being positioned in the lower chamber 12, the fan 37 is able to cool the refrigerant in the condenser 35 to release heat from an evaporator hole positioned at the side of the cabinet 1.

Figure 10:
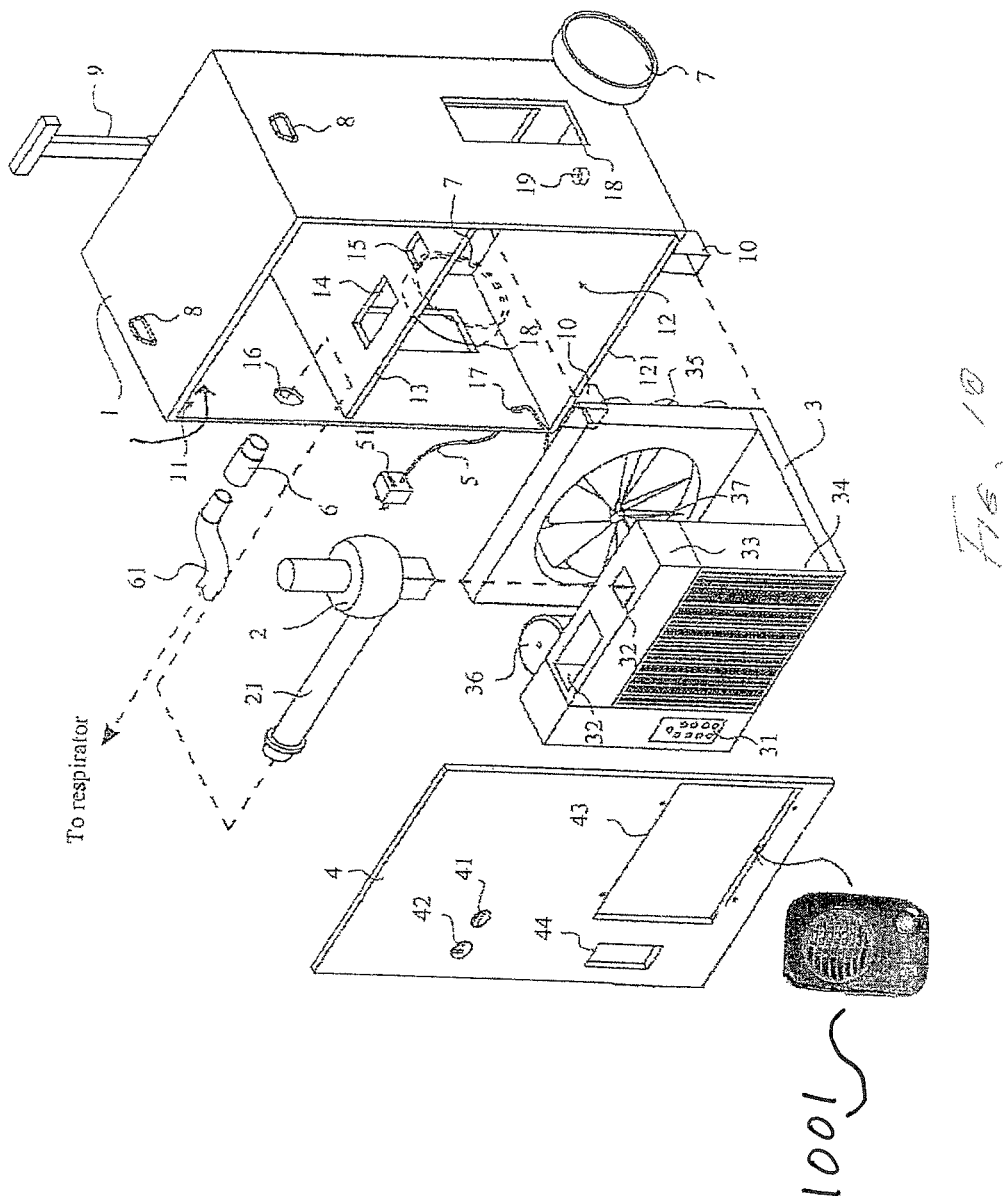
FIG. 10 is a perspective exploded view of an example embodiment of the present invention with a portable heater.

In some embodiments, as shown in FIG. 10, the system is equipped with an optional space heater 1001 that, when needed, delivers additional heat to the interior of the cabinet 1 through the evaporator 34.

Figure 11:
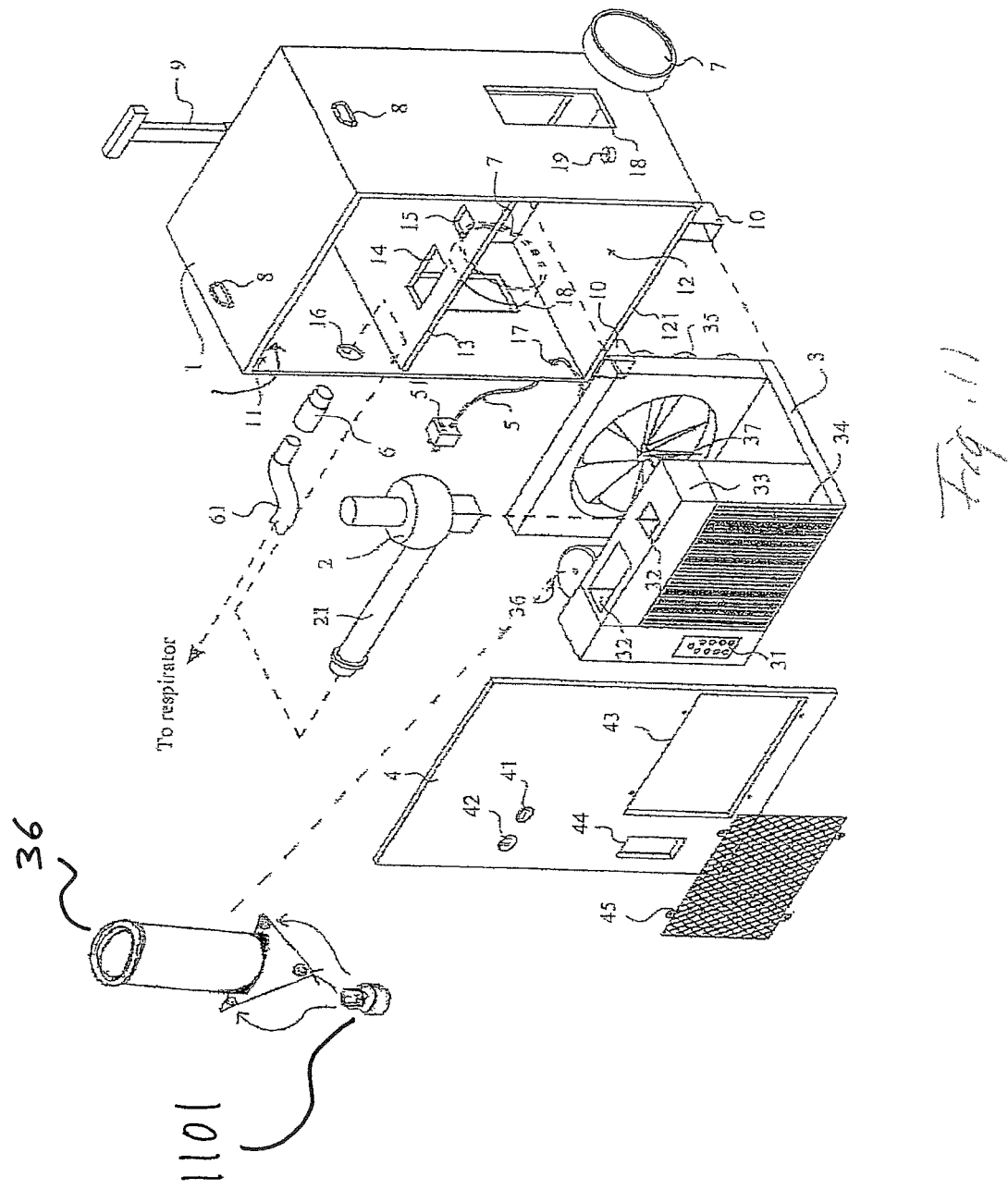
FIG. 11 is a perspective exploded view of an example embodiment of the present invention with mobility bushings positioned beneath the compressor order to reduce the transmission of vibrations to the cabinet.

In some embodiments, as shown in FIG. 11, the system includes polyoxymethylene mobility bushings 1101 positioned directly beneath the triple bolt pattern of the compressor 36 order to reduce the transmission of vibrations to the cabinet 1.

The cabinet cover plate 4 is used to enclose the refrigerant air conditioning unit 3 and the blower 2 into the upper chamber 11 and the lower chamber 12. The cabinet cover plate 4 also acts as a front panel for the user to access the controls of the present invention. The cabinet cover plate 4 comprises a blower power switch 41, a blower control switch 42, an evaporator hole 43, a control panel hole 44 and an outer filter 45. The blower power switch 41 and the blower control switch 42 are positioned adjacently to each other on an upper half of the cabinet cover plate 4. The blower power switch 41 and the blower control switch 42 are connected directly the blower 2. The blower power switch 41 provides the user with the ability to allow electrical power to flow to the blower 2. The blower control switch 42 allows the user to regulate the amount of power that is relayed to the blower 2 to control the flow rate of air (e.g. cubic feet per minute) being conditioned and provided to the users within the preferred rate of 0-97 cfm. The evaporator hole 43 is positioned on the lower half of the cabinet cover plate 4. The control panel hole 44 is positioned adjacently to the evaporator hole 43 on the cabinet cover plate 4. When the refrigerant air conditioning unit 3 is positioned into the lower chamber 12 of the cabinet 1 and the cabinet cover plate is fastened onto the cabinet 1 over the upper chamber 11 and the lower chamber 12, the evaporator hole 43 is aligned directly over the evaporator 34 of the refrigerant air conditioning unit 3. Additionally, the control panel hole 44 is aligned directly over the control panel 31 on the refrigerant air conditioning unit 3. The evaporator hole 43 on the cabinet cover plate 4 allows the refrigerant air conditioning unit 3 to draw ambient air from the surrounding environment to be conditioned and delivered. The control panel hole 44 provides the user with access to the control panel 31. As a result, the user is able to manage the temperature of the air conditioned by the present invention. In a preferred embodiment of the present invention, the control panel 31 is a digital control panel 31 that can be programmed to set the specific temperature of the conditioned air. While air is being drawn through the evaporator hole 43, air is being filtered by the outer filter 45. The outer filter 45 is fastened directly to the cabinet cover plate 4 over the evaporator hole 43. With the outer filter 45 being fastened over the evaporator hole 43, all of the air drawn is required to pass through the outer filter 45. This prevents any unwanted particulates from being circulated back into the air. In a preferred embodiment of the present invention, the outer filter 45 is a washable filter that is able to catch dust, pollen, mold, bacteria, and other solid particulates that are in the air. The outer filter 45 should be fully capable of filtering any unwanted solid particulates in the air, and thus must comprise appropriate filter material—a simple mesh or grille arrangement is not adequate for the outer filter as particulates may traverse through large openings in a mesh or grille.

In a preferred embodiment of the present invention, the partition 13 is a completely insulated half inch rigid insulation board. As a result, the upper chamber 11 is separate and insulated from the lower chamber 12. The blower 2 being positioned in the upper chamber 11 further comprises a cool air supply tube 21. The cool air supply tube 21 is an exterior manifold pipe that supplies the regulated air for the present invention. The cool air supply tube 21 is extended from the blower 2 and is fastened to the cool air outlet hole 16. It should be specifically noted that the cool air supply tube 21 is connected to the blower 2 on the downstream side of the blower 2—that is, the air flow path produced by the blower is directional and passes through the blower 2 first, then the cool air supply tube 21 and subsequently through the cool air supply hole 16. The blower 2 is positioned directly over the blower inlet opening 15 which is further aligned with the cool air supply hole 32 of the refrigerant air conditioning unit 3 in the lower chamber 12. The blower 2 moves air from the cool air supply hole 32 to the cool air outlet hole 16 through the cool air supply tube 21. Furthermore, a second cool air supply hole 32 is aligned to the air relief hole 14 on the partition 13.

Figure 12:
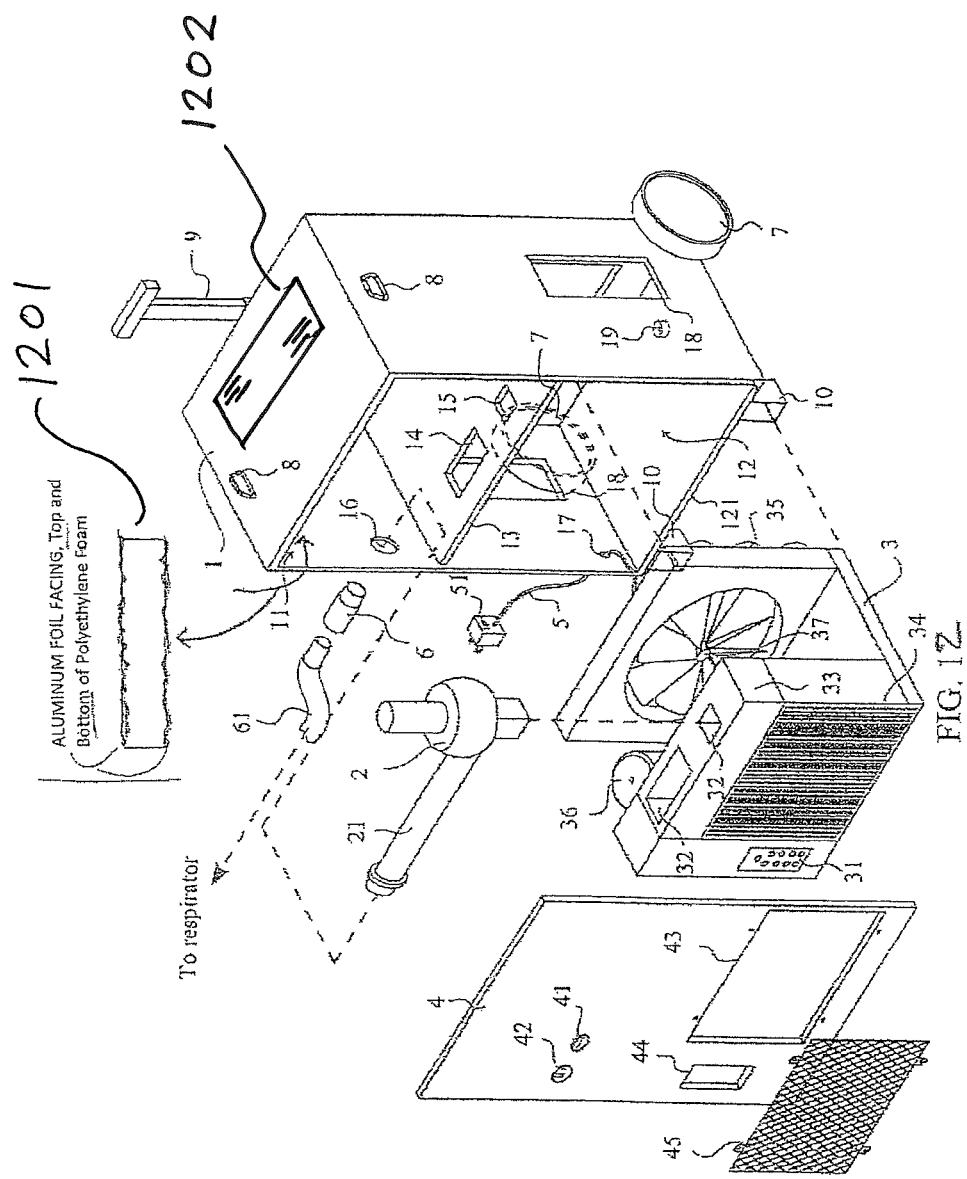
FIG. 12 is a perspective exploded view of an example embodiment of the present invention with a composite insulation material within the interior of the upper chamber of the cabinet and an acrylic polymer light-reflective material, generally with a reflective finish, affixed to a top surface of the cabinet and adapted to reflect sunlight.

In some embodiments, as shown in FIG. 12, the system is equipped with a composite insulation material 1201 within the interior of the upper chamber 11. This composite insulation material 1201, which may include a polyethylene foam, or a similar polyethylene material, with an aluminum foil facing at the top, protects the interior of the upper chamber 11 from moisture, mold, and mildew. The composite insulation material 1201 also helps to inhibit heat transfer from the exterior of the cabinet 1.

The air outlet manifold 6 is positioned adjacent to the exterior of the cabinet 1 opposite the upper chamber 11. The air outlet manifold 6 is connected to the cool air outlet hole 16 and the air supply line 61 is connected to the air outlet manifold 6 opposite the cabinet 1. The air outlet manifold 6 and the air supply line 61 are additional components in the air flow path of the present invention which allow air flowing out from the cool air outlet hole 16 to be delivered to a user or users. The air supply line 61 is a flexible tube or hose and may be attached to the air outlet manifold 6 by any appropriate means, such as, but not limited to, hose clamps, a screw thread fitting, similar inner and outer diameters of the breathing tube 61 and the air outlet manifold 6, respectively, or other appropriate means or types of tube or pipe fittings as known in the art. The air supply line 61 may be permanently connected to the air outlet manifold 6 or the air supply line 61 may be able to be removed from the air outlet manifold 6 for transport or storage, but the latter embodiment is preferred. It should be noted that the dimensions of the air outlet manifold 6 and the air supply line 61 are not of particular importance to the functionality of the present invention so long as the dimensions are properly configured with the specifications of the blower 2 and other relevant components of the present invention to be able to deliver a desired air flow rate to the user.

It should be noted that the air supply line 61 has been referred to herein as the entirety of tubing connecting the air outlet manifold 6 and the respirator. However, in practice the air supply line 61 is separated into two portions: a primary air line and a breathing tube. In a preferred embodiment of the present invention the primary air line comprises the majority of tube length between the air outlet manifold and the user. The primary air line preferably comes in a variety of lengths, such as, but not limited to, 100 feet, 150 feet, 200 feet, 250 feet, and 300 feet in length, though the primary air line is not limited to solely the listed lengths. In a preferred embodiment of the present invention, the breathing tube is eight feet in length, but is not limited to said dimension. The purpose of the primary air line is to get the air supply line 61 to the vicinity of the user, and the breathing tube is connected to the primary air line to more particularly provide air to the user. While in use the breathing tube is preferably supported by a waist belt connected around the user's waist, so that the user has improved control for manipulating the breathing tube as necessary while working and so the weight of the breathing tube does not accidentally pull the respirator off the user's face. In a preferred embodiment of the present invention, the primary air line has an inner diameter of 1.25 inches and the breathing tube has an inner diameter of 1 inch. These dimensions are specified so that back pressure is not caused on the blower 2. In another preferred embodiment, a Niosh primary air line has an inner diameter of 1 inch, and a Niosh breathing tube has an inner diameter of ¾ inches. However, it should be noted that the primary air line and the breathing tube are not limited to said dimensions, and may comprise alternate dimensions as deemed appropriate or necessary for alternate embodiments.

In some embodiments of the present invention, as shown in FIG. 12, an acrylic polymer light-reflective material 1202, generally with a reflective finish, is affixed to a top surface of the cabinet 1. The acrylic polymer light-reflective material 1202 reflects up to 75% of IR radiation from sunlight. The acrylic polymer light-reflective material 1202 thereby reduces extreme heat variables that otherwise would be transmitted and absorbed through the exterior of the cabinet 1.

Figure 2:
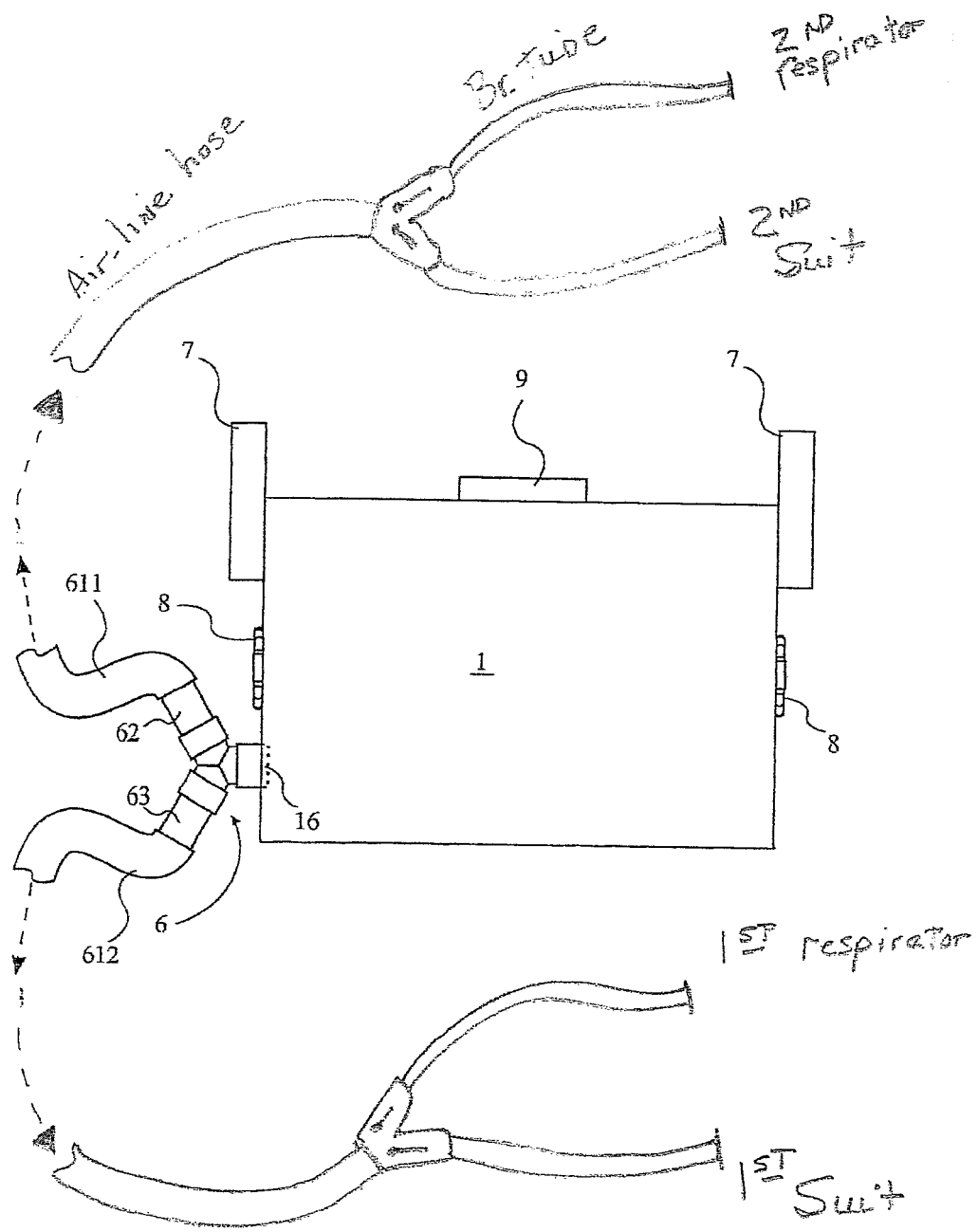
FIG. 2 is a top view of an example embodiment of the present invention with a double line manifold.
Figure 6:
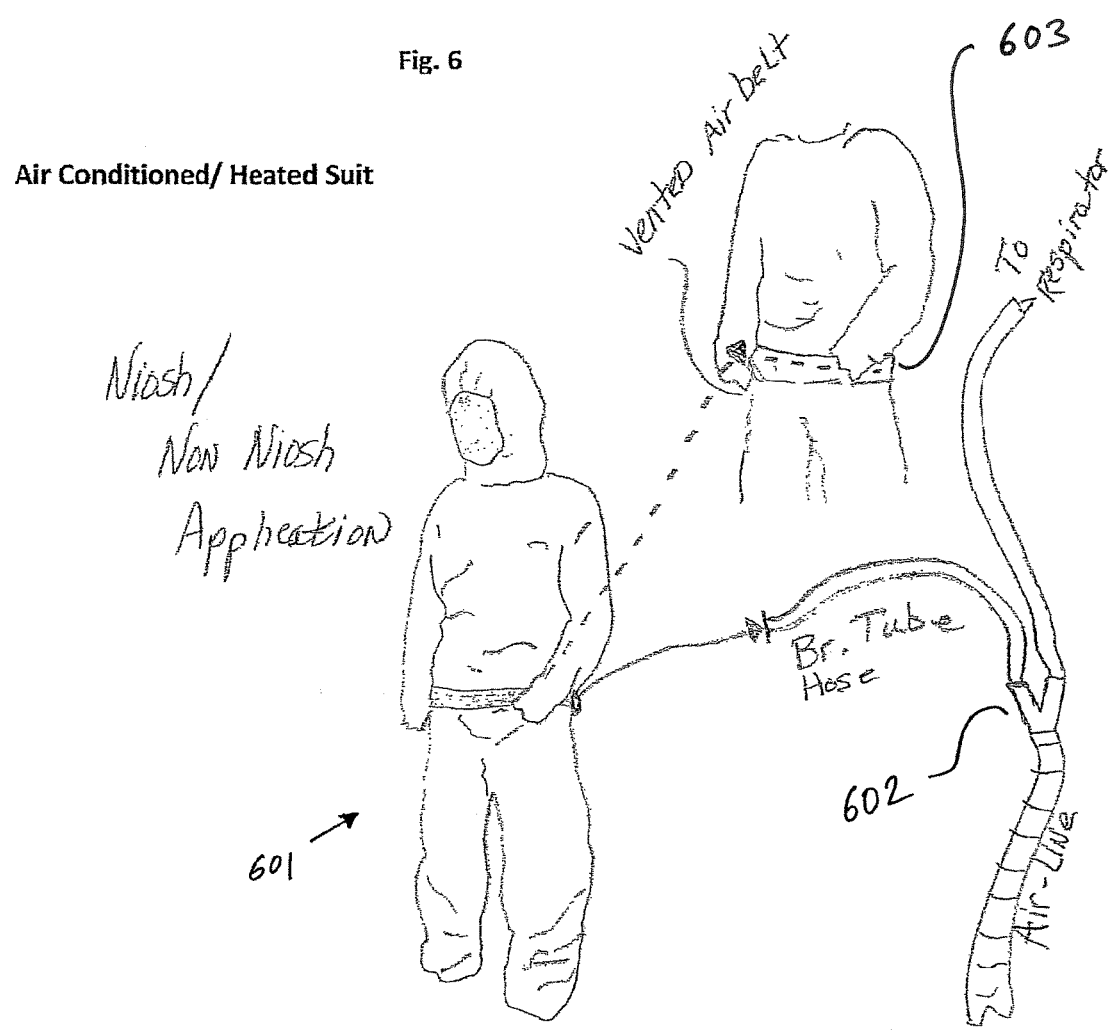
FIG. 6 is a perspective view an example embodiment of the present invention incorporating an air conditioned or heated suit.

In one example embodiment of the present invention, the air outlet manifold 6 comprises a single tube fitting which the air supply line 61 is connected to, as shown in FIG. 1. In an alternate embodiment shown in FIG. 2, the air outlet manifold 6 comprises a first tube fitting 62 and a second tube fitting 63. This alternate embodiment allows two users to be supplied with conditioned air simultaneously from the same unit. A first air supply line 611 is connected to the first tube fitting 62, wherein the first air supply line 611 supplies breathable air from the cool air supply hole 16 to a first respirator apparatus worn by a first user. Similarly, a second air supply line 612 is connected to the second tube fitting 63, wherein the second air supply line 612 supplies breathable air from the cool air supply hole 16 to a second respirator apparatus worn by a second user. Further, each air supply line 611 and 612 may be connected to a branching air-line hose that allows that air supply line to deliver air to a respirator and to a suit as described below and as illustrated in FIG. 6. Additionally, the present invention is not limited to two users, and it should be noted that alternate embodiments may comprise more than two tube fittings and air supply lines for more than two users.

To power the present invention, the electrical cord 5 is traversed through the power cable hole 17 into the lower chamber 12. The electrical cord 5 is directly connected to the refrigerant air conditioning unit 3 and the blower power switch 41. To protect the present invention from surges, the electrical cord 5 preferably comprises a circuit breaker 51. The circuit breaker 51 is built in-line with the electrical cord 5. In case, a surge is sensed, the circuit breaker 51 automatically cuts power off to the present invention. To reset power to the refrigerant air conditioning unit 3 and the blower 2, the user is able to resent the circuit breaker 51 switch to allow power flow through the electrical cord 5.

The present invention is a portable air conditioning system that is sufficiently small to be easily carried by one user. For such a task, the cabinet 1 can further comprise of a pair of side handles 8 that are connected to the cabinet 1 exterior adjacent to the upper chamber and positioned opposite each other on the cabinet 1. Alternatively or additionally, the present invention comprises an extendable handle 9 connected to the cabinet, positioned vertically and preferably positioned opposite the cabinet cover plate 4 on the cabinet 1. The extendable handle 9 preferably is a T-shaped handle held within a vertical sheath connected to the side of the cabinet 1 that may be slid vertically within the sheath to extend or retract the extendable handle 9. Alternatively or additionally, the cabinet 1 can be pushed or pulled using wheels or casters positioned on the base. Preferably, the present invention comprises a pair of wheels 7 that are connected to the cabinet 1 adjacent to the floor 121 of the cabinet 1 and positioned opposite each other on the cabinet 1. Additionally, a preferred embodiment comprises a pair of legs 10 connected to the bottom of the cabinet 1 opposite the pair of wheels 7 so that the cabinet 1 rests level on both the pair of wheels 7 and the pair of legs 10. In some embodiments, as shown in FIG. 1, the wheels 7 are equipped with pneumatic tires 107 that include a cushioning air pocket.

To keep the present invention light and portable, the cabinet 1 can be made from different types of materials including thin steel, aluminum, or any other types of light sturdy metals. In a preferred embodiment, the cabinet 1 and the cabinet cover plate 4 are finished with a powder coat application.

In some embodiments, the system includes a brushless blower, preferably equipped with a CFM control positioned on the manifold. The brushless blower utilizes a high-flow fan system.

FIG. 3 is a perspective view of hose insulation 301 and protective scuff jacket 302 for hoses for use in connection with example embodiments of the present general inventive concept.

FIG. 4 is a view of several example embodiments of masks and headgear for use in connection with the present general inventive concept. Examples of masks and headgear that may be used with various example embodiments of the present invention include a hood 401, a full-faced mask 402, a welder mask 403, and an air flow shield 404.

FIG. 5 is a view of several example embodiments of hoses and breathing tube assemblies for use in connection with the present general inventive concept. An air-line hose 501 and a Niosh air-line hose 502 are illustrated. Also illustrated are two examples of breathing tube assemblies: a breathing tube assembly 503, with belt 513, for attachment to non-Niosh headgear; and a Niosh breathing tube assembly 504, with belt 514, for attachment to Niosh headgear.

FIG. 6 is a perspective view an example embodiment of the present invention incorporating an air conditioned or heated suit 601. The suit 601 is connected to the system by a hose that is split from the breathing tube by a wye adapter valve 602 attached to the air-line hose. The wye adapter valve 602 controls the air flow and temperature delivered to the end user through the hose and the breathing tube. Generally the hose connects to the suit 601 on the right or left side of the suit 601, at about waist level, preferably with a personal control valve near the waist at the point where the hose connects with the suit 601. A waistband with a slit-vented hose (hereinafter "air belt") 603 attaches around the user's waist. A controllable loop keeps the air belt 603 in place. Air conditioned or heated air from the cabinet 1 is delivered to the user wearing the suit 601 through the hose to the suit 601 at the waist-level connection and through the breathing tube directly to the respirator or headgear. In some embodiments, the suit 601 is fabricated from nylon or from a high-density polyethylene fiber, or from similar materials.

Figure 7:
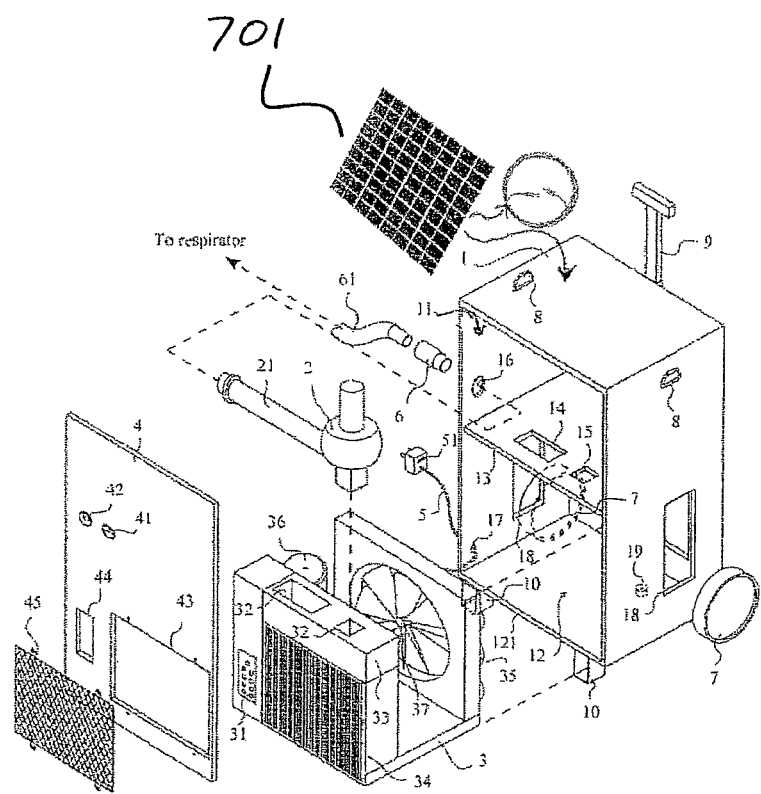
FIG. 7 is a perspective exploded view of an example embodiment of the present invention with a solar panel and solar power cord adapted to provide electrical power to the system.
Figure 8:
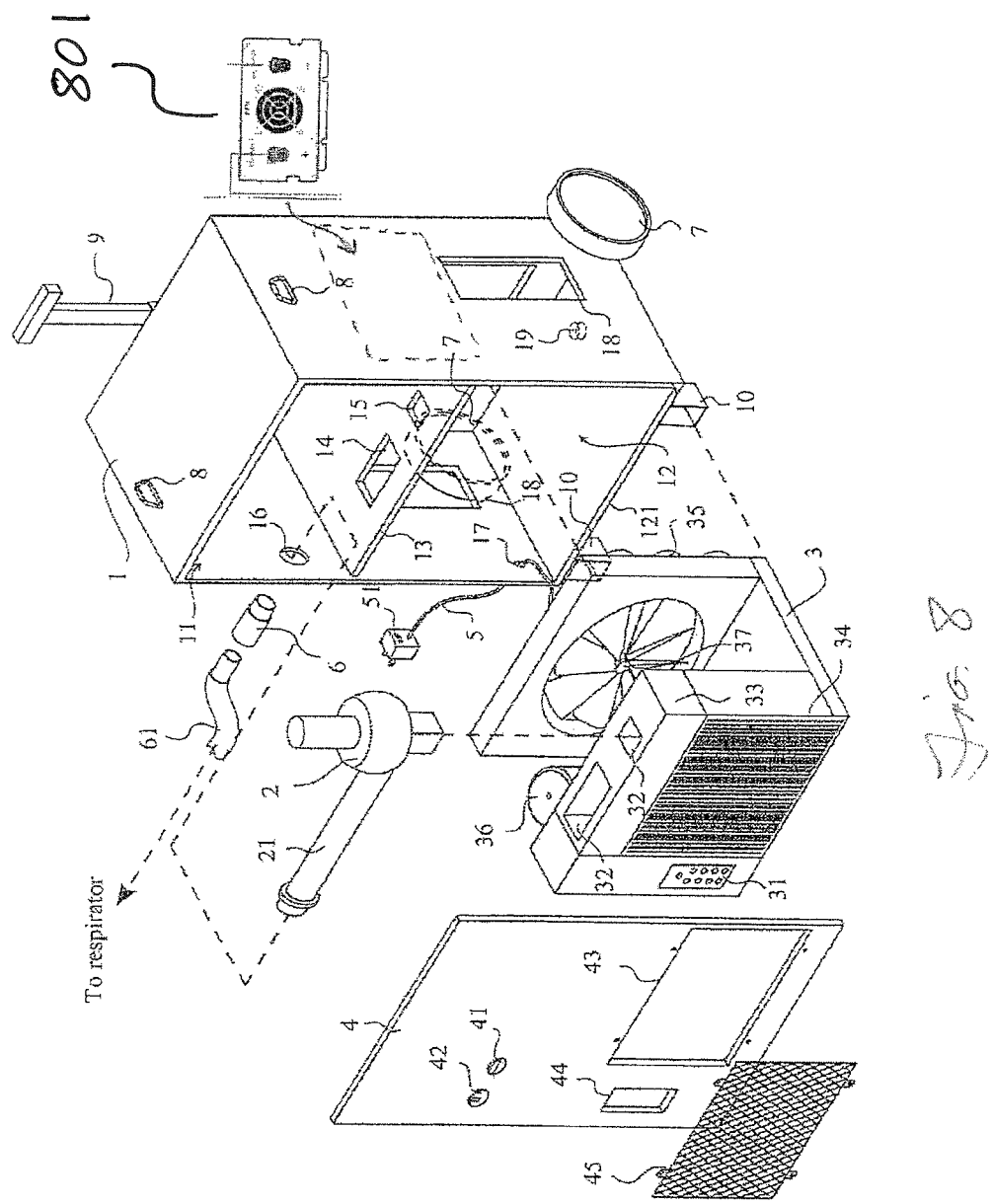
FIG. 8 is a perspective exploded view of an example embodiment of the present invention with a power invertor.

In some embodiments, as shown in FIG. 7, the system includes one or more solar panels 701 to provide power to the system, preferably along with a solar power cord 702. Generally the one or more solar panels 701 are installed on a top surface of the cabinet 1. In some embodiments, the system also includes a solar power invertor 801 with charger, as shown in FIG. 8. The solar power invertor 801 is adapted to balance and control variable direct current output from the solar panels 701.

Although the invention has been explained in relation to its preferred embodiment, it is to be understood that many other possible modifications and variations can be made without departing from the spirit and scope of the invention as hereinafter claimed.

What is claimed is:

1. An air conditioned and ambient fresh air supply system for a respirator user comprising:
    (a) a cabinet including:
        (i) an upper chamber;
        (ii) a lower chamber;
        (iii) an insulated partition separating the upper chamber from the lower chamber, said insulated partition having a blower inlet opening between the upper chamber and the lower chamber, said insulated partition having an air relief hole therethrough;
    (b) a refrigerant air conditioning unit that is entirely contained within the lower chamber, said refrigerant air conditioning unit:
        (i) including an ambient air inlet for drawing air from the surrounding environment;
        (ii) being adapted to cool ambient air drawn through the ambient air inlet;
        (iii) including a first conditioned air outlet for discharging cooled air;
    (c) a blower in the upper chamber, said blower comprising:
        (i) a blower inlet that is in fluid communication with the first conditioned air outlet of the refrigerant air conditioning unit through the blower inlet opening;
        (ii) a blower outlet comprising a cool air supply tube;
        (iii) a blower fan that is adapted to draw cooled air from the first conditioned air outlet of the air conditioning unit through the blower inlet and discharge the cooled air from the first conditioned air outlet of the air conditioning unit through the cool air supply tube;
        (iv) a blower control switch that may be operated by a user to regulate the rate at which cooled air is discharged through the cool air supply tube within a range of 0-97 cubic feet per minute.

2. The air conditioned and ambient fresh air supply system of claim 1 wherein:
    (a) the cabinet further comprises a pair of side walls, each of which includes a ventilation hole leading into the lower chamber; and
    (b) each of the ventilation holes comprises a protective grille.

3. The air conditioned and ambient fresh air supply system of claim 1 wherein:
    (a) the refrigerant air conditioning unit comprises:
        (i) a condenser;
        (ii) an evaporator;
        (iii) a compressor;
        (iv) a fan;
        (v) a second conditioned air outlet that is aligned with the air relief hole through the insulated partition;
    said refrigerant air conditioning unit being adapted to utilize a refrigerant to extract heat from ambient air drawn through the ambient air inlet and discharge cooled air through the first conditioned air outlet into the blower inlet and through the second conditioned outlet into the upper chamber.

4. The air conditioned and ambient fresh air supply system of claim 1 which includes a filter to filter ambient air drawn through the ambient air inlet.

5. The air conditioned and ambient fresh air supply system of claim 1 further comprising a cabinet cover plate.

6. The air conditioned and ambient fresh air supply system of claim 1 wherein the cabinet:
    (a) includes a floor for the lower chamber;
    (b) a drain plug hole traversing vertically through the floor of the lower chamber.

7. The air conditioned and ambient fresh air supply system of claim 6 further comprising a pair of wheels that are connected to the cabinet adjacent to the floor for the lower chamber and are positioned opposite each other on the cabinet.

8. The air conditioned and ambient fresh air supply system of claim 1 which includes a pair of side handles that are connected to the cabinet exterior adjacent to the upper chamber and on opposite sides of the cabinet.

9. The air conditioned and ambient fresh air supply system of claim 1 which includes an extendable handle that is connected to the cabinet and oriented vertically on the cabinet.

10. The air conditioned and ambient fresh air supply system of claim 1, further comprising:
    (a) an air outlet manifold that is connected to the cool air supply tube, said air outlet manifold including a first tube fitting;
    (b) a first air supply line that is connected between the first tube fitting of the air outlet manifold and a first respirator apparatus.

11. The air conditioned and ambient fresh air supply system of claim 10:
(a) wherein the air outlet manifold includes a second tube fitting;
(b) which includes a second air supply line that is connected between the second tube fitting and a second respirator apparatus.

12. The air conditioned and ambient fresh air supply system of claim 1 further comprising a solar panel adapted to supply electrical power to the refrigerant air conditioning unit.

13. The air conditioned and ambient fresh air supply system of claim 1 further comprising a washable foam filter including reticulated polyurethane foam.

14. The air conditioned and ambient fresh air supply system of claim 13 wherein the reticulated polyurethane foam includes an open-cell polyurethane foam.

15. The air conditioned and ambient fresh air supply system of claim 1 further comprising a portable heater adapted to heat air to be drawn into the refrigerant air conditioning unit.

16. The air conditioned and ambient fresh air supply system of claim 1 further comprising a suit to be worn by the respirator user, the suit including means for receiving air from the refrigerant air conditioning unit.

17. A mobile air supply system for a respirator user comprising:
a mobile cabinet having an first chamber and a second chamber;
an insulated partition separating the first chamber and the second chamber of the mobile cabinet;
a first opening formed in the insulated partition;
an air conditioning (AC) unit disposed entirely within the first chamber and having an inlet and a first outlet, the AC unit configured to draw ambient air in through the inlet, to cool the ambient air, and then discharge the cooled ambient air via the first outlet so that the cooled ambient air discharged from the first outlet is directed through the first opening in the insulated partition; and
a blower disposed in the second chamber of the cabinet and having an inlet and an outlet, wherein the inlet of the blower is operatively joined to the first opening in the insulated partition such that the cooled ambient air discharged from the first outlet of the AC unit flows through the first opening of the partition and then into the inlet of the blower and is then discharged via the outlet of the blower.

18. The system of claim 17 further comprising:
a second outlet through which cooled ambient air is discharged from the AC unit; and
a second opening formed in the insulated partition arranged such that the cooled ambient air discharged via the second outlet from the AC unit outlet passes through the second opening in the insulated partition and into the upper chamber but not into the blower.

19. The system of claim 18 wherein
the AC unit includes an evaporator and an air outlet cover, wherein the evaporator is positioned at the inlet of the AC unit such that ambient air entering the AC unit via the inlet of the AC unit immediately flows into the evaporator;
wherein the air outlet cover is connected to the evaporator such that cooled ambient air flowing out of the evaporator flows through the air outlet cover, and wherein the first and second outlets are formed in the air outlet cover such that a first stream of the cooled ambient air flows through the first outlet formed in the air outlet cover and then into the first opening of the insulated partition and a second stream of the cooled ambient air flows through the second outlet formed in the air outlet cover and then into the second opening of the insulated partition.

* * * * *